United States Patent [19]
Wyssen

[11] 3,839,967
[45] Oct. 8, 1974

[54] CABLE CAR SUSPENSION AND SELF-CONTAINED DRIVE MECHANISM

[76] Inventor: Jakob Wyssen, Reichenbach im Kandertal, Switzerland

[22] Filed: May 4, 1973

[21] Appl. No.: 357,370

[30] Foreign Application Priority Data
May 16, 1972 Switzerland.................... 7280/72

[52] U.S. Cl............. 104/173 R, 104/115, 104/124, 104/182
[51] Int. Cl............................................ B61b 7/18
[58] Field of Search 104/89, 93, 112, 115, 123–125, 104/173 R, 180, 182, 197, -199, 229, 230; 74/230.5, 230.7

[56] References Cited
UNITED STATES PATENTS

| | | | |
|---|---|---|---|
| 626,783 | 6/1899 | Dusedau | 104/197 X |
| 3,037,465 | 6/1962 | McIntyre | 104/173 X |
| 3,353,503 | 11/1967 | Pettit | 104/93 X |

FOREIGN PATENTS OR APPLICATIONS

| | | | |
|---|---|---|---|
| 1,202,807 | 8/1970 | Great Britain | 104/197 |
| 1,142,761 | 9/1957 | France | 74/230.7 |

Primary Examiner—Lloyd L. King
Assistant Examiner—Randolph A. Reese
Attorney, Agent, or Firm—Benjamin H. Sherman

[57] ABSTRACT

A cable car suspension and self-contained drive mechanism designed to be primarily supported by and travel over a single cable which is fixed at both ends and supported at intermediate points by pylon towers. The cable car hangs on a frame which carries three pulleys located in a triangular or other arrangement. The pulleys at the outer lower corners of the triangular arrangement support the cable car by riding on the cable except when the assembly passes over the top of a pylon tower. At this time, the cable is lifted out of its support on the pylon tower and the lower pulleys ride on tracks mounted on the pylon tower, thus causing the cable car to be temporarily supported directly on the pylon tower. The cable is wrapped partially around one lower pulley, then around the upper pulley, and then partially around the other lower pulley. One or more pulleys may be driven, but the total peripheral surface of the driving pulleys should exceed 180 degrees. Thus, if the upper pulley is driven, the cable should extend around it for at least more than 180° whereas, if both the lower pulleys are driven, the cable should extend around each one for more than 90°.

17 Claims, 5 Drawing Figures

PATENTED OCT 8 1974 3,839,967

CABLE CAR SUSPENSION AND SELF-CONTAINED DRIVE MECHANISM

BACKGROUND OF THE INVENTION

1. Field of the Invention

This invention relates in general to cable cars, and in particular, to a self-propelled cable car.

2. Description of the Prior Art

Cable cars which are self-propelled and use a single cable have been used where their use is needed for a relatively short time, and it is not economically feasible to install an elaborate permanent two cable system. Applications for such cable cars exist in forestry, for example, where inadequate roads exist, and where it is desirable to move across mountain forests, construction sites, etc. Of course, single cable cars can also be used for tourists and other applications.

Such cable cars of the prior art have used pulleys mounted below and above the cable to clamp the cable between them by spring tension. Such cable cars must have a large number of cable pulleys so as to provide that the pulleys do not slip on the cable. Also, a special construction of the cable carrier supports is required for such prior art devices which must be passed by the lower as well as the upper pulleys.

Ice and frost also present particular problems in such prior art machines, because ice covered cable has only a small percent of the friction of unfrozen greased cable. Also, the slope gradient which can be used with prior art cable cars is very limited.

Attempts have been made to use caterpillar type clamps to engage the cable on opposite verticle sides; however, such devices are complicated and expensive and still do not increase friction under frost conditions. Also, the speed of such devices is very slow.

SUMMARY OF THE INVENTION

The present invention comprises a novel cable car support and self drive in which the cable car is temporarily shifted from being supported on the cable to being supported on a pylon tower as the cable car passes the pylon tower, the cable car drive remaining constant under both circumstances.

It is an object of this invention to provide a novel support and drive for a cable car carried on a single cable.

It is a further object of this invention to provide a novel pulley structure having cable confining means and means for cooperating with tracks on a pylon tower.

The present invention provides a cable car which is capable of operating on heavily iced cables without substantial loss of friction.

The present invention provides a pulley arrangement in which the cable contacts the surface of the driving pulley or pulleys for more than 180°.

The cable car of this invention greatly increases the life expectancy of the cable.

DETAILED DESCRIPTION

The most common form of cable car support in the past has been one in which one or more cables, stretched between two end points, and intermediately supported by pylon towers, carry the cable car, while separate cables, driven from one or both of the end points, move the car over the cable. Some efforts have been made in the past to provide an arrangement in which only a single cable is used for supporting the cable car with self-contained means in the car to move the cable car along the cable. This has involved great difficulty in the past due to the problem of having the cable car supporting means pass each intermediate pylon tower. The present invention overcomes this problem by providing a cable car support and self drive, in which the cable car is temporarily shifted from being supported on the cable to being supported on the pylon tower as the cable car passes the pylon tower, and in which the cable car is being constantly positively driven as it passes the tower.

Figure 1:
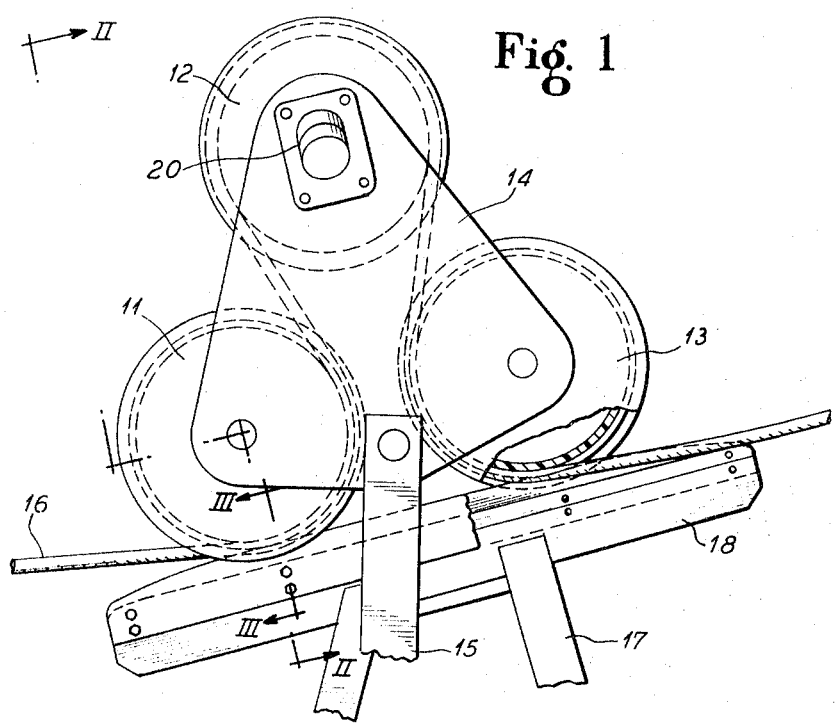
FIG. 1 is a diagrammatic side view of the pulley carriage, a portion of the cable and the top of a pylon tower.
Figure 2:
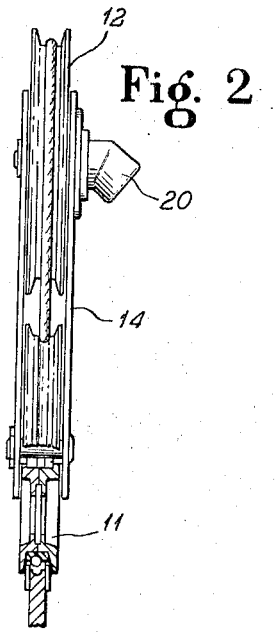
FIG. 2 is a diagrammatic end view taken along line II—II of FIG. 1.
Figure 4:
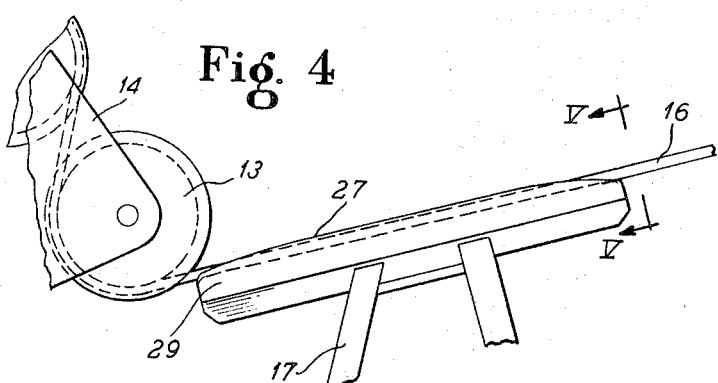
FIG. 4 is a fragmentary side view similar to a portion of FIG. 1, but showing the pulley carriage just before it reaches the tracks on the pylon tower.

Referring first to FIGS. 1 and 2, there is shown therein, a pulley carriage for supporting the cable car embodying the present invention. Specifically, three pulleys 11, 12 and 13 are pivotally mounted on a pair of plates 14. To these plates 14, a cable car supporting strap 15 is pivotally mounted. Each of the pulleys 11, 12 and 13 are grooved to receive the main supporting cable 16. It is to be understood that the cable 16 is connected between two end points (not shown) and that intermediate points along the cable 16 are supported by pylon towers 17 which have track means 18 at the top, which will later be described. The pulleys 11, 12 and 13 are triangularly arranged as shown in FIG. 1, the two lower pulleys 11 and 13 being the support means, while the upper pulley 12 being the drive means. In FIG. 1, the pulleys are mounted in a triangular arrangement with the axis of the upper pulley above the other pulleys. However, four or more pulleys in a rectangular or trapazoidal arrangement could be used. As will be readily observed from an inspection of FIG. 1, the cable is wrapped partially around pulley 11, then more than 180° around the upper drive pulley 12, and then back and partially around the other lower pulley 13.

The means for driving the upper pulley 12 may be any suitable means, such for example, as a hydraulic motor 20 carried in the upper pulley assembly which is supplied with fluid through a tube (not shown) from a pump carried in the cable car (not shown). Alternately, a small electric motor may be provided in the upper pulley assembly which may be driven by electric power supplied through electric lines extending from a motor driven power generator on the cable car (not shown). The pulleys 11 and 13 are of special design, as may be seen particularly from an inspection of FIG. 3. Specifically, the pulley 11 (as well as the pulley 13) includes a center plate 21 which has two flange members 22 and 23 which are secured to the center plate by bolts or other means 24. These flange members 22 and 23 provide the recess groove 25 for receiving the cable, this groove 25 imprisoning a packing material 26, as for example, rubber, so as to reduce wear on the cable 16. As may be seen from an inspection of FIG. 3, there are two inwardly facing shoulders 27 spaced inwardly from the outer periphery 28 of the flange members 22 and 23. These shoulders 27 also prevent the material 26 from flowing from the member 13 under the load of the cable.

As the cable car approaches a pylon tower, the advancing lower pulley rides up onto a pair of track plates 29 carried on the main support plate 30 of the pylon tower 17. This causes the cable car to be temporarily supported by the pylon tower rather than by the cable 16. Cable 16, of course, continues its wrap around the pulley, as may be seen in FIG. 3.

Figure 5:
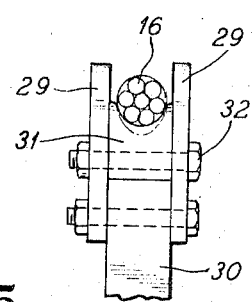
FIG. 5 is a diagrammatic end view showing the cable lying between the tracks of and supported by the pylon tower when the cable car is not passing thereover.

After the cable car passes the pylon tower, the cable is again directly supported in a cable supporting block 31, as may be seen in FIG. 5. This cable block 31 is, of course, curved to seat the cable during all times except when the cable car is passing thereby. The block 31 and the track plates 29 are secured by bolts or other suitable means 32.

It is important to note that at all times the upper pulley 12 is in direct driving relation with the cable, irrespective of whether the pulley carriage is passing over the pylon tower or whether it is being directly supported on the cable itself. It will further be observed that there is very little wear on the cable with this type of support and drive assembly, which, of course, is very advantageous and reduces cost.

In the preferred form of the present invention, it is preferable that the loop angle around the drive pulley 12 be approximately 240° or more.

It will also be appreciated that either of the bottom pulleys 11 or 13 may be the drive pulley for the assembly instead of pulley 12, or two or three of the pulleys may be driven.

One advantage of the present construction is that during operation of the cable car on an icy cable, the ice crust is broken away by pulleys 11 and 13 at the first bend of the cable, so that an ice-free cable comes into contact with the channel of the drive pulley 12.

One of the most important features of the cable car of this invention is that the total loop angle of the driven pulleys is 180° or more. In the embodiment of FIG. 1, where only pulley 12 is driven, the cable loop around pulley 12 is about 240°, which is more than 180°. If only pulleys 11 and 13 were driven, the loop angle about each of these is more than 90°, and the total loop angle of the driven pulleys is greater than 180°. If four pulleys, arranged in a rectangular or trapezoidal configuration, were used, and all four pulleys were driven, then preferably, four loop angles of just approximately 90° should be used to give a total loop angle greater than 180°.

Since the construction above described involves bending the cable 16 considerably more than in the case of common cable cars, it is desirable to take particular measures in the design of the pulleys to increase the life expectancy of the cable. One such measure, as described above, is to line the channel of all three pulleys with an elastic material such as rubber.

The cable car of the present invention has a pulley arrangement which causes ice and frost to be broken from the cable as it bends around the first pulley and thus much improved frictional contact exists than in prior art systems.

Figure 3:
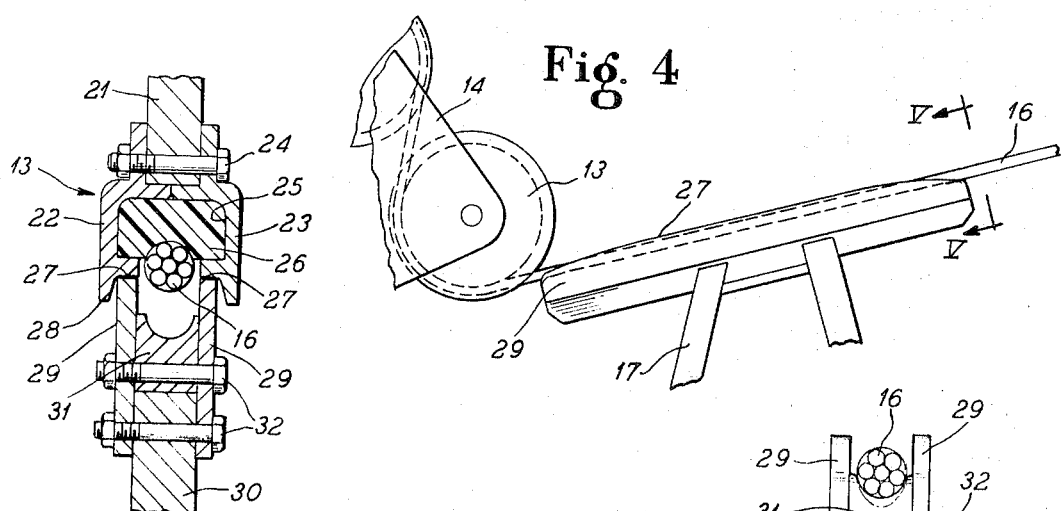
FIG. 3 is a sectional end view, as taken along line III—III of FIG. 1, showing the lower left pulley of FIG. 1 riding along tracks at the top of the pylon tower.

Since the cable flexes as it passes over the cables, it is desirable as in conventional systems to design the system for long cable life. This can be accomplished by lining the pulleys with rubber as shown in FIG. 3. Also, the life expectancy of a cable depends on the number of alternate bends, the ratio of the pulley diameter to the cable diameter, and on the pulling tension of the cable. Without rubber lining in the pulleys, the present invention provides alternate bending life expectancy of 15,000 passages result, with wire cable having 6 strands of 19 wires each, and a diameter of 16 mm. with a pulley diameter of 500 mm. and a cable tension of 30 kg/mm$^2$. However, by adding rubber lining 26 to the pulleys, the life expectancy will be greatly increased. Also, by using a cable having a larger number of smaller wires, the life expectancy will be increased.

The present invention allows the cable to be easily inspected from the cable car, so that the cable is always safe.

It will be well understood that many modifications and variations may be effected without departing from the spirit and scope of the present invention.

I claim as my invention:

1. A carriage for supporting a cable car on a single cable comprising: three pulleys mounted in a triangular arrangement on said carriage including an entry and an exit pulley constituting the sole supporting means for said cable car as said entry and exit pulleys ride on said cable; an intermediate pulley disposed above said entry and exit pulleys and having said cable wrapped at least 180° therearound; and means for driving said intermediate pulley from said cable car.

2. A cable car system comprising: a single cable extending between two points; at least one pylon tower located between said two points, supporting said cable; a pulley carriage riding on said cable and arranged to support a cable car, said carriage including three pulleys about which said cable successively passes, the cable entry and cable exit pulleys constituting supporting means for said cable car and the intermediate pulley having said cable pass at least partially therearound; and means for driving said intermediate pulley from said cable car.

3. A system according to claim 2, in which each of said pylon towers has track means for engaging said entry and exit pulleys to directly support said cable car on said track means and lift said cable away from being supported by said pylon tower.

4. A cable car supporting carriage comprising: a group of at least three coplanar mounted pulleys over which a suspension cable successively passes, at least the entry and exit pulleys of said group riding on said cable and at least one additional pulley in said group mounted above said entry and exit pulleys and over which said cable passes; means for directly driving at least one of said pulleys; and said cable making contact with the driven pulleys.

5. A carriage according to claim 4, in which each of said entry and exit pulleys have a channel for receiving said cable with inwardly extending shoulders which stop short of said cable.

6. A carriage according to claim 5, in combination with a pylon tower which normally supports an intermediate short length of said cable, track elements on said tower for engaging said shoulders of said entry and exit pulleys as they pass said tower, said track elements transferring the weight of said carriage from said cable to said tower as said entry and exit pulleys pass thereover while leaving said cable still partially wrapped around said entry and exit pulleys.

7. A carriage combination according to claim 6, in which said cable normally rests between said track elements and is directly supported by said tower when said carriage is not passing thereover.

8. A carriage combination according to claim 6, in which at least an additional pulley is hydraulically driven.

9. A carriage combination according to claim 6, in which at least an additional pulley is electrically driven.

10. A carriage combination according to claim 6, in which there is only one entry pulley, one exit pulley and one additional pulley.

11. A carriage according to claim 4, in which means carried by said carriage drives at least one of said pulleys.

12. A carriage according to claim 4, in which means carried by said carriage drives one of said additional pulleys.

13. A carriage according to claim 4, in which said entry and exit pulleys are spaced apart a distance less than the diameter of one of said additional pulleys.

14. A carriage according to claim 4, in which said entry and exit pulleys have wear resistant material in the channel of each where the cable passes thereover.

15. A cable car supporting carriage on a stationary cable comprising: a plurality of pulleys rotatably supported by said carriage and said cable passing over said pulleys, means driving at least one of said pulleys and at least 180° of said driven pulley engaged by said cable.

16. A cable car supporting carriage according to claim 15, wherein there are three pulleys, and the axes of rotation of said plurality of pulleys are arranged in a triangle with the axis of the middle pulley mounted above the axes of the other pulleys.

17. A carriage for supporting a cable car on a single stationary cable comprising: three pulleys mounted on said carriage, said pulleys constituting the sole supporting and driving means for said cable car; said pulleys including an entry pulley, an exit pulley, and an intermediate pulley disposed between said entry and exit pulleys, with said cable bending around said entry and exit pulleys in one direction and around said intermediate pulley in the opposite direction; and means for driving said intermediate pulley from said cable car.

* * * * *